United States Patent
Gerstenberger et al.

(10) Patent No.: US 8,437,295 B2
(45) Date of Patent: May 7, 2013

(54) FAST RANDOM ACCESS FOR AN ENHANCED UPLINK DEDICATED CHANNEL

(75) Inventors: Dirk Gerstenberger, Stockholm (SE); Johan Bergman, Stockholm (SE); Christer Edholm, Taby (SE); Jose Luis Pradas, Jorvas (FI); Stefan Wager, Espoo (FI); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 434 days.

(21) Appl. No.: 12/740,080

(22) PCT Filed: Oct. 30, 2008

(86) PCT No.: PCT/SE2008/051238
§ 371 (c)(1), (2), (4) Date: Apr. 27, 2010

(87) PCT Pub. No.: WO2009/058089
PCT Pub. Date: May 7, 2009

(65) Prior Publication Data
US 2010/0246701 A1 Sep. 30, 2010

Related U.S. Application Data

(60) Provisional application No. 60/983,727, filed on Oct. 30, 2007.

(51) Int. Cl.
*H04W 72/04* (2009.01)
(52) U.S. Cl.
USPC .......................................... 370/329; 370/328
(58) Field of Classification Search .................. 370/230, 370/310–313, 322, 326, 328–329, 335, 341–342, 370/346, 349
See application file for complete search history.

(56) References Cited

U.S. PATENT DOCUMENTS

| 8,014,359 | B2 * | 9/2011 | Cave et al. ................... 370/332 |
|---|---|---|---|
| 2003/0139170 | A1 | 7/2003 | Heo |
| 2006/0029011 | A1 * | 2/2006 | Etemad et al. ............... 370/311 |
| 2007/0140115 | A1 * | 6/2007 | Bienas et al. ................ 370/230 |
| 2010/0182947 | A1 * | 7/2010 | Jong et al. ................... 370/316 |
| 2010/0182974 | A1 * | 7/2010 | Barraclough et al. ........ 370/329 |

FOREIGN PATENT DOCUMENTS
WO 00/56096 9/2000

OTHER PUBLICATIONS

3rd Generation Partnership Project. "Enhanced Random Access with E-DCH." 3GPP TSG-RAN WG2 Meeting #59bis, R2-074010, Shanghai, China, Oct. 8-12, 2007.
3rd Generation Partnership Project. "Discussion on RACH Enhancements." 3GPP TSG RAN WG2 #59bis, R2-074165, Shanghai, China, Oct. 8-12, 2007.
3rd Generation Partnership Project. "Resource Assignment for E-DCH Access in CELL_FACH State." 3GPP TSG-RAN WG2 Meeting #60, R2-074626, Jeju, Korea, 509 Nov. 2007.

* cited by examiner

Primary Examiner — Jeffrey M Rutkowski
Assistant Examiner — Syed M Bokhari
(74) Attorney, Agent, or Firm — Coats & Bennett, P.L.L.C.

(57) ABSTRACT

The present invention relates to fast random access methods and arrangements for the enhanced uplink dedicated channel of E-UTRAN (Evolved Universal terrestrial radio access network). A user equipment (UE) being in a low activity state sends a random access request comprising a preamble on a physical random access channel (PRACH) to a NodeB. The NodeB receives the request and sends in response to the received random access request a response comprising information associated with detection of the preamble on an acquisition indicator channel (AICH). The response comprises further an extension of the AICH an indication of an action to be taken by the UE. In an embodiment of the present invention the action is to access the E-DCH and the response comprises configuration parameters to the E-DCH.

25 Claims, 10 Drawing Sheets

| Resource allocation | b2 | b1 | b0 |
|---|---|---|---|
| R0 | 0 | 0 | 0 |
| R1 | 1 | 0 | 0 |
| R2 | 0 | 1 | 0 |
| R3 | 1 | 1 | 0 |
| R4 | 0 | 0 | 1 |
| R5 | 1 | 0 | 1 |
| R6 | 0 | 1 | 1 |
| R7 | 1 | 1 | 1 |

… # FAST RANDOM ACCESS FOR AN ENHANCED UPLINK DEDICATED CHANNEL

TECHNICAL FIELD

The present invention relates the area of wireless communication, and especially to fast random access methods and arrangements for the enhanced uplink dedicated channel of E-UTRAN (Evolved Universal terrestrial radio access network).

BACKGROUND

UTRAN (Universal Terrestrial Radio Access Network) is a term that identifies the radio access network of a UMTS (Universal Mobile Telecommunications System), wherein the UTRAN consists of Radio Network Controllers (RNCs) and NodeBs i.e. radio base stations. The NodeBs communicate wirelessly with mobile user equipments and the RNCs control the NodeBs. The RNCs are further connected to the Core Network (CN). Evolved UTRAN (E-UTRAN) is an evolution of the UTRAN towards a high-data rate, low-latency and packet-optimised radio access network. Further the E-UTRAN consists of NodeBs, and the NodeBs are interconnected and further connected to the Evolved Packet Core network (EPC). E-UTRAN is also being referred to as Long Term Evolution (LTE) and is standardized within the $3^{rd}$ Generation Partnership Project (3GPP).

A user equipment (UE) in the E-UTRAN may be in either an idle mode or a connected mode. Based on UE mobility and activity while in the connected mode the E-UTRAN may direct the UE to transit between a number of radio resource control (RRC) sub-states: Cell_PCH, URA_PCH, Cell_FACH and Cell_DCH state. UEs with high transmission activity should be in Cell_DCH state, where power-controlled dedicated channels are established to and from the UE. In Cell_DCH state, the UE is assigned dedicated radio and hardware resources, which minimizes processing delay and allows for high capacity. UEs with low transmission activity should be in Cell_FACH state, where only common channels are used. In Cell_FACH state, no dedicated hardware resources in the NodeB are needed. UEs with no transmission activity are idle, i.e. in Cell_PCH or URA_PCH states, which enables very low UE power consumption but does not allow any data transmission.

Figure 1:
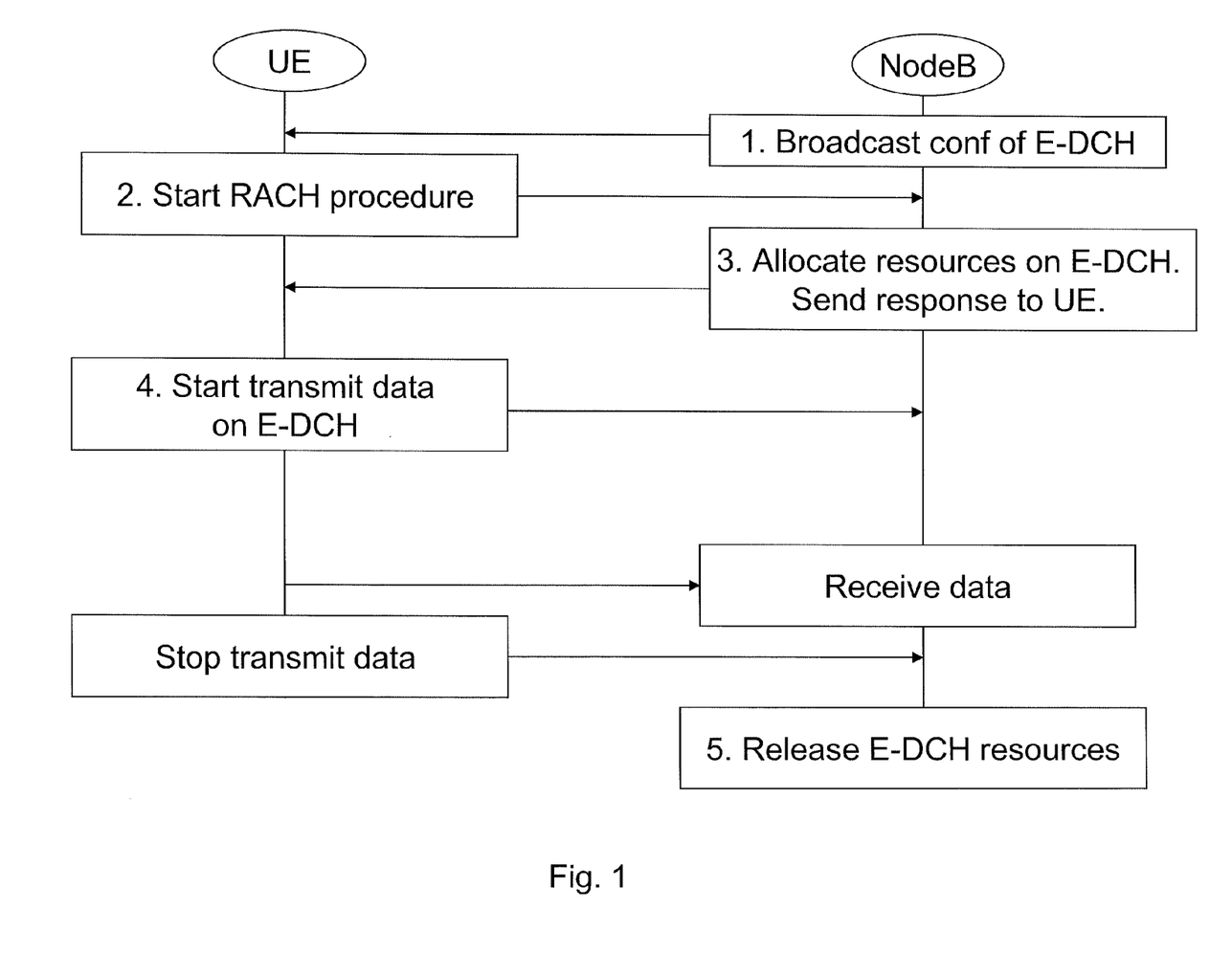
FIG. 1 shows the fast E-DCH access procedure according to the state of the art.

In the context of 3GPP release 8, the application of Enhanced Uplink in the Cell_FACH state is discussed to improve the uplink transmission. Thus, the UE should be able to send uplink data in Cell_FACH state with higher throughput than what is possible today. For this purpose, the UE will need to use an enhanced dedicated channel (E-DCH) as soon as possible and without transiting to Cell_DCH state, as the transition to Cell_DCH state would imply communication with the RNC. Briefly, the discussed fast E-DCH access procedure, as illustrated in FIG. 1, would be:

1. The NodeB broadcasts the configuration of the common E-DCH, which can be used for uplink traffic in CELL_FACH state.
2. The UE starts the Random Access Channel (RACH) procedure.
3. The NodeB sends a response to the UE and additionally it sends codes, timing offsets and any other additional information to the UE enabling the UE to transmit data on allocated resources of the common E-DCH. No interaction with the RNC is required.
4. The UE starts transmitting data using the resources allocated by the NodeB. Whether NodeB was able to allocate resources to the UE on the common E-DCH the UE will omit the data part of the RACH procedure and continue to transmit data on the E-DCH. However, the UE will use the data part of the RACH procedure whether no resources could be allocated on the common DCH.
5. When the UE has no more data to send, the NodeB releases the common E-DCH resources.

SUMMARY

The procedure described above implies the problem to indicate the available resources to the UE during the fast E-DCH access procedure.

Thus, it is the object of the present invention to provide methods and arrangements for an improved fast E-DCH access procedure.

The object is achieved according to the present invention by signaling uplink channel access information for E-DCH to a UE being in a low activity state, using the same AICH channelization code that is used for normal Random Access Channel (RACH) users.

In accordance with a first aspect of the present invention, a method for a radio base station for signaling uplink channel access information to a UE being in a low activity state is provided. In the method a random access request comprising a preamble on a physical random access channel, PRACH, is received. A response comprising information associated with detection of the preamble on an AICH is sent in response to the received random access request. The response further comprises in an extension of the AICH an indication of an action to be taken by the UE.

According to a second aspect of the present invention, a method for accessing an uplink channel for a UE being in a low activity state is provided. In the method a random access request comprising a preamble on a PRACH is sent to a radio base station. A response comprising information associated with detection of the preamble at the radio base station on an acquisition indicator channel, AICH is received. Further an indication of an action to be taken based on said response, in an extension of the AICH, is determined.

According to a third aspect of the present invention, a radio base station adapted for signaling uplink channel access information to a UE being in a low activity state is provided. The radio base station comprises a receiver for receiving a random access request comprising a preamble on a PRACH. Moreover, the radio base station comprises a sender for sending in a response to the received random access request a response comprising information associated with detection of the preamble on an AICH. The response further comprises in an extension of the AICH an indication of an action to be taken by the UE.

According to a fourth aspect of the present invention, a UE adapted for accessing an uplink channel when being in a low activity state is provided. The UE comprises a sender for sending a random access request comprising a preamble on a PRACH to a radio base station. Moreover the UE comprises a receiver for receiving a response comprising information associated with detection of the preamble at the radio base station on an AICH. In addition, the UE comprises means for determining an indication of an action to be taken based on said response, in an extension of the AICH.

An advantage of the present invention is that it provides an efficient solution to signal ACK/NACK/DTX to up to 8 fast E-DCH access users and to indicate to each user one out of 8 or more resource configurations.

Another advantage is that no additional channelization code is used, as the present invention extends the existing AICH channel by adding 16 new sequences and making use of the currently unused last 8 bits of the AICH.

Yet another advantage is that the transmitted peak-to-average power ratio of the first QPSK symbols of all sequences in the AICH is reduced in an embodiment of the invention in case of that ACK is transmitted to multiple users in the wireless communication network.

BRIEF DESCRIPTION OF THE DRAWINGS

For a better understanding, reference is made to the following drawings and preferred embodiments of the invention.

DETAILED DESCRIPTION

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The present invention relates to methods and arrangements for signaling uplink channel access information for E-DCH to a UE being in a low activity state, using the same AICH channelization code that is used for normal Random Access Channel (RACH) users. Examples of implementations of such methods and arrangements are described below.

According to one embodiment of the present invention, the UE being in a low activity state sends a random access request comprising a preamble on a physical random access channel (PRACH) to a NodeB. The NodeB receives the request and sends in response to the received random access request a response comprising information associated with detection of the preamble on an acquisition indicator channel (AICH). The response comprises further in an extension of the AICH an indication of an action to be taken by the UE. In an embodiment of the present invention the action is to access the E-DCH and the response comprises configuration parameters to the E-DCH.

Although the invention is extendable for a person skilled in the art to other numbers of fast E-DCH access user, the present invention is described in the following for a configuration where 8 normal RACH users can receive ACK/NACK/DTX and where 8 fast E-DCH access users can receive ACK/NACK/DTX together with an indication of which one out of 8 or more resource configurations to use.

As stated above, the UE starts the RACH procedure by sending a random access request comprising a preamble on a physical RACH (PRACH) to the NodeB. The NodeB sends an acknowledgement in the form of acquisition indicators (AIs). AIs are mapped to the AICH transmitted on the downlink. Each AI may be '0', '+1', or '−1', where a '+1' corresponds to positive acknowledgement ACK, which means that the NodeB has detected the preamble and that the UE being in the low activity state can access the E-DCH. A '0' corresponds to no acknowledgement DTX, which means that the NodeB has not detected the preamble. A '−1' corresponds to a negative acknowledgement NACK, which means that the NodeB has detected the preamble but the UE is commanded to abort the RACH procedure and make another attempt with a preamble on PRACH.

Figure 2:
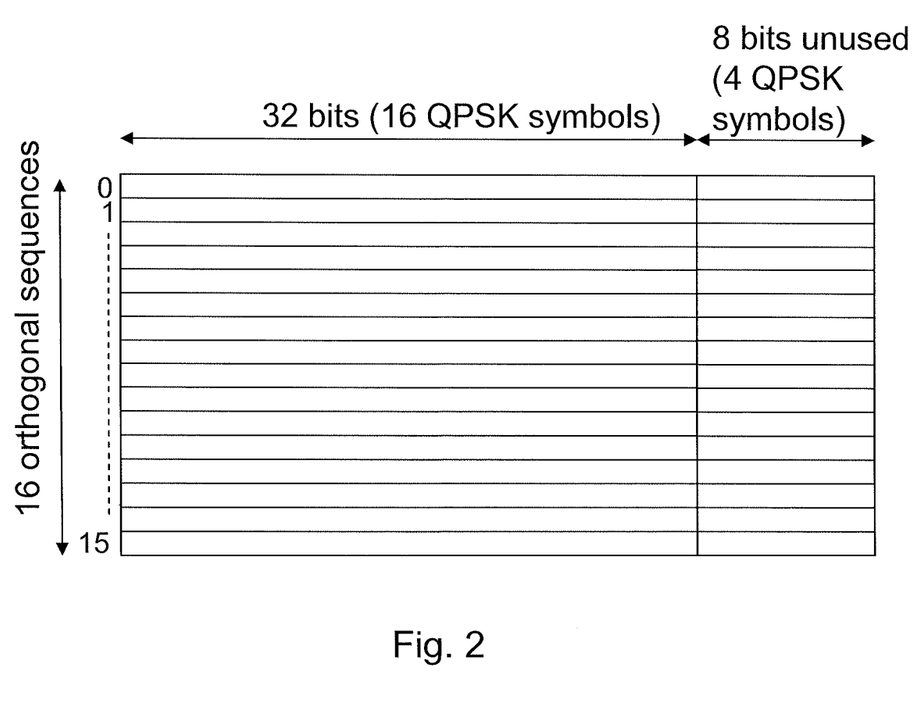
FIG. 2 illustrates the state of the art AICH.

In the 3G mobile communication standards the QPSK modulation is used for the downlink. 16 orthogonal sequences of length 32 bits representing 16 QPSK symbols are carried on one AICH channelization code of spreading factor 256 to indicate acquisition indicators, i.e. ACK/NACK/DTX, to up to 16 UEs. FIG. 2 illustrates the state of the art AICH. One or several sequences of the 16 sequences (0, 1, . . . , 15) are modulated with a value '+1' for ACK i.e. positive acknowledgement, a value '−1' for NACK i.e. negative acknowledgement and a value '0' for DTX i.e. no acknowledgement to one or several UEs. The remaining 8 bits representing 4 QPSK symbols in the end of each sequence are currently unused.

Figure 3:
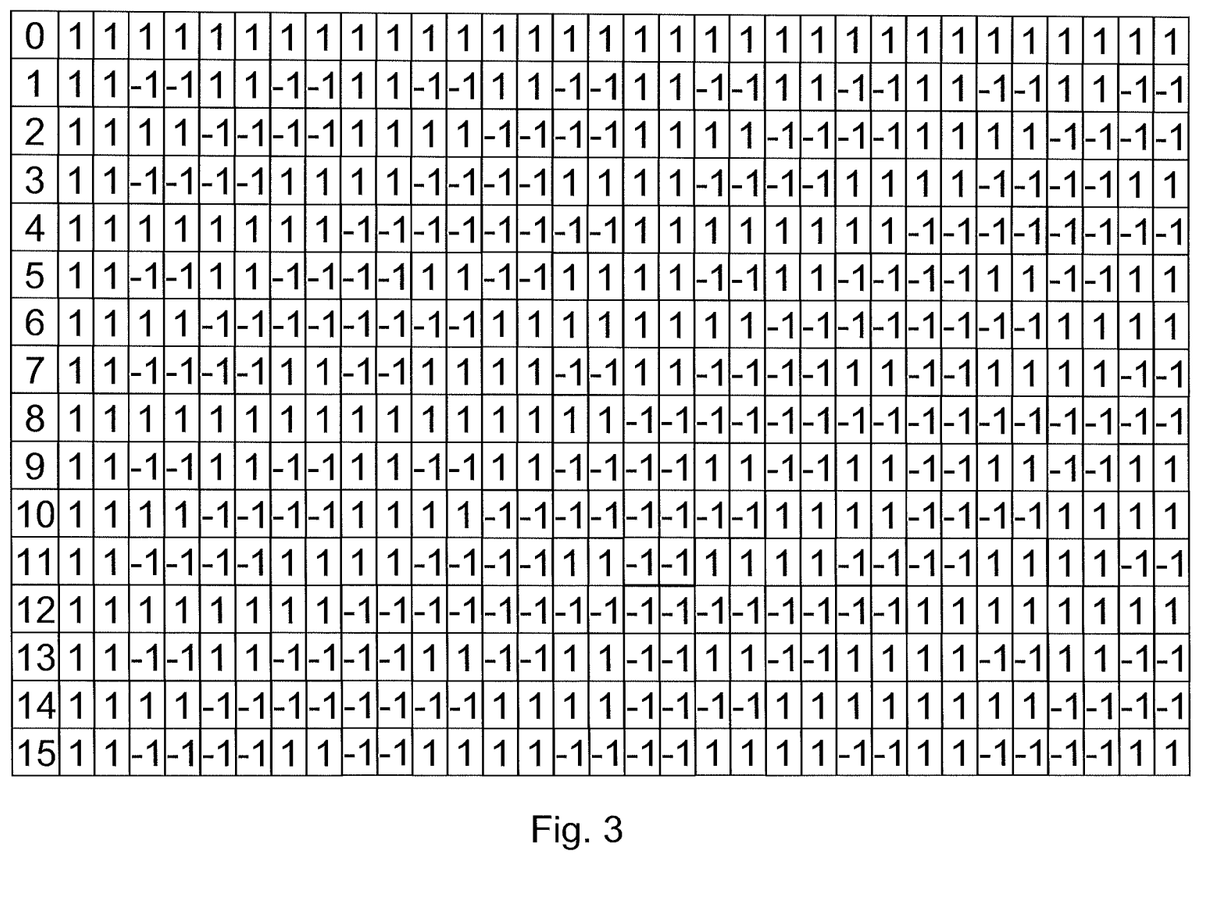
FIG. 3 shows the 16 sequences used for the state of the art AICH as defined in 3GPP TS 25.211.

The 16 sequences used for the state of the art AICH are defined in 3GPP TS 25.211 and are depicted in FIG. 3.

Figure 4:
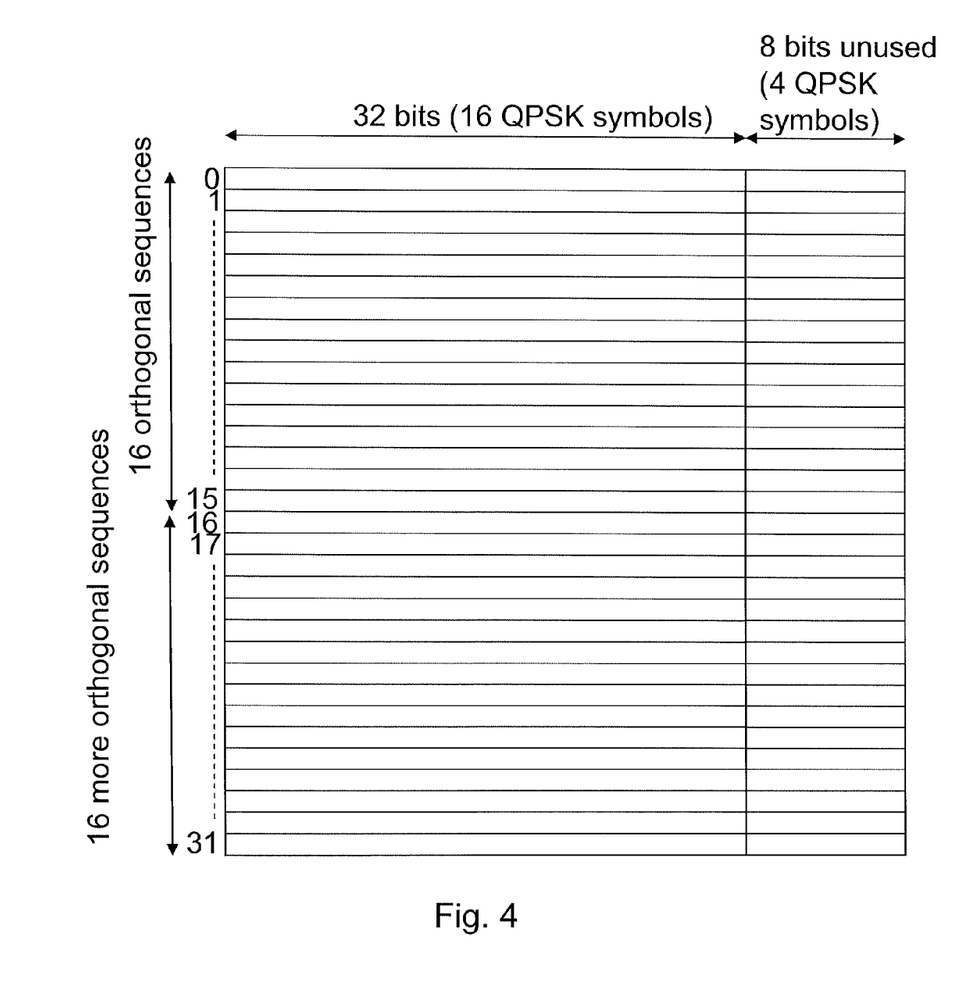
FIG. 4 illustrates an extended AICH with 16 additional orthogonal sequences according to an embodiment of the present invention.

In one embodiment of the present invention the AICH is extended with 16 additional orthogonal sequences (16, 17, . . . , 31). The extended AICH is depicted in FIG. 4. Furthermore, the sequences are generated in a way that sequence 16 is orthogonal to the sequence 0. The sequence 16 is picked from a set of sequences which corresponds to a 90 degree phase shifted version of the set of sequences used for sequence 0. Further, sequence 17 is the 90 degree phase shifted version of sequence 1 and so on until sequence 31 which is the 90 degree phase shifted version of sequence 15.

Figure 5:
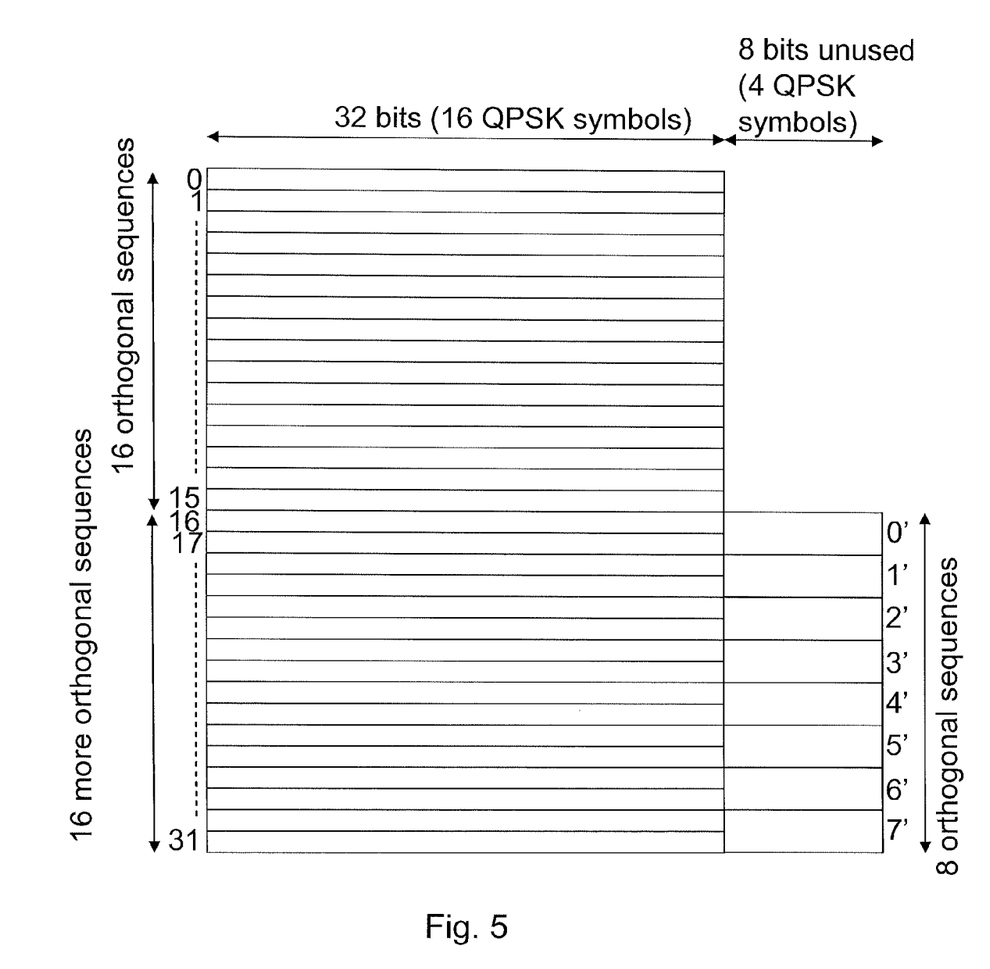
FIG. 5 depicts how the extension of the AICH is performed by allocating 8 orthogonal sequences in the remaining 8 bits of sequences 16-31 according to an embodiment of the present invention.

An additional extension of the AICH is performed by allocating 8 orthogonal sequences in the remaining 8 bits of sequences 16-31. The extension is depicted in FIG. 5. More specifically, one orthogonal sequence of length 8 bits representing 4 QPSK symbols belongs to two orthogonal sequences of length 32, for the orthogonal sequences 16-31. The 8 orthogonal sequences of length bits, i.e. sequences 0'-7', can be generated from Walsh sequences of length 8 bits as follows:

Sequence 0' = +1, +1, +1, +1, +1, +1, +1, +1

Sequence 1' = +1, −1, +1, −1, +1, −1, +1, −1

Sequence 2' = +1, +1, −1, −1, +1, +1, −1, −1

Sequence 3' = +1, −1, −1, +1, +1, −1, −1, +1

Sequence 4' = +1, +1, +1, +1, −1, −1, −1, −1

Sequence 5' = +1, −1, +1, −1, −1, +1, −1, +1

Sequence 6' = +1, +1, −1, −1, −1, −1, +1, +1

Sequence 7' = +1, −1, −1, +1, −1, +1, +1, −1

However, the 8 orthogonal sequences could also be generated from other type of sequences of length 8 bits.

As shown in FIG. 5, a total of 32 orthogonal sequences of length 32 bits are now available. Additionally, 8 orthogonal sequences of length 8 bits are available, whereof each sequence is associated with a pair of orthogonal length 32 bits sequences for sequences 16-31.

In one embodiment of the present invention the 32 orthogonal sequences of length 32 bits and the 8 orthogonal sequences of length 8 bits are utilized to carry ACK/NACK/DTX indication to up to 8 UEs using RACH and ACK/NACK/DTX indication along with resource indication to up to 8 UEs using E-DCH. As an example, the first 8 orthogonal sequences of length 32 bits, i.e. sequences 0-7, are reserved to carry ACK/NACK/DTX to 8 UEs using RACH, i.e. they are associated with PRACH preambles 0-7. Further, the next 8 orthogonal sequences of length 32 bits, i.e. sequences 8-15, are used to carry ACK/NACK/DTX to 8 UEs using E-DCH, i.e. they are associated with PRACH preambles 8-15. The remaining 16 orthogonal sequences of length 32 bits, i.e. sequences 16-31, are pair-wise associated with the aforementioned orthogonal sequences 8-15, respectively. Furthermore, each one of the 8 orthogonal sequences of length 8 bits, i.e. sequences 0'-7', is associated with a pair of orthogonal length 32 sequences, i.e. sequences 16-31, respectively.

In accordance with the above, 8 sequence sets are now available and can in total carry the acquisition indicator, i.e. ACK/NACK/DTX, and 3 information bits to indicate one out of 8 preconfigured resource allocations to up to 8 UEs using the E-DCH. Each sequence set consists of:
one sequence of length 32 bits from sequences 8-15, which is modulated with the value '+1' in case of ACK, the value '−1' in case of NACK and the value '0' in case of DTX,
two consecutive sequences of length 32 bits from sequences 16-31, which are modulated with a value '+1' if a corresponding information bit has the value '0', or modulated with a value '−1' if the corresponding information bit has the value '1 ', respectively and
one sequence of length 8 bits from sequences 0'-7', which is modulated with a value '+1' if a corresponding information bit has the value '0 ', or modulated with a value '−1 ' if a corresponding information bit has the value '1'.

Figure 6:
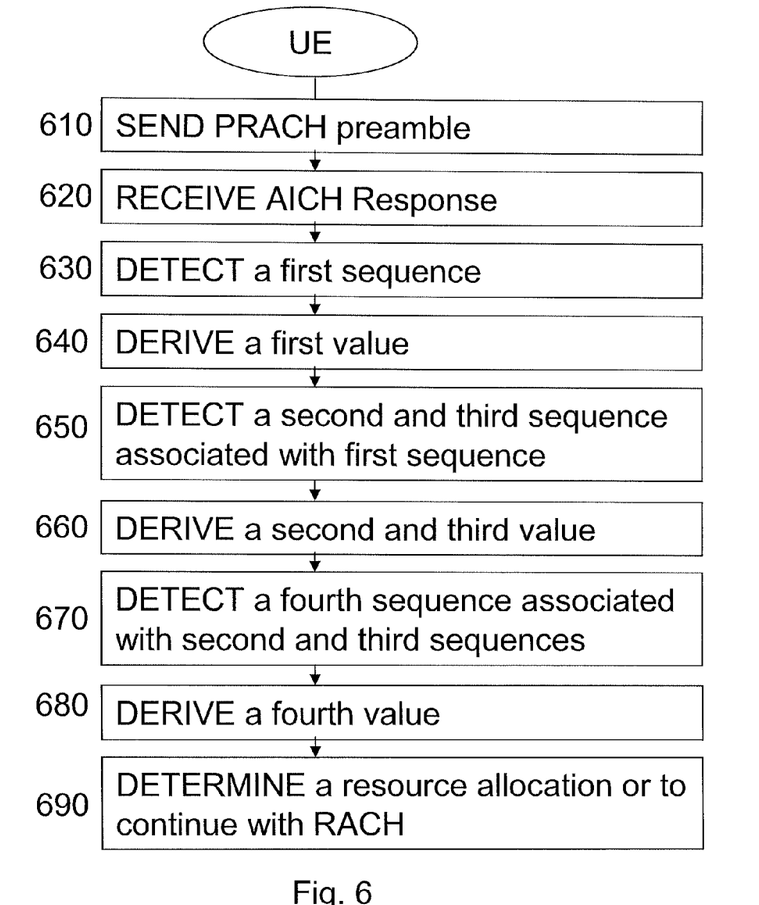
FIG. 6 is a flowchart of the method for a UE according to an embodiment of the present invention.

As mentioned previously, the fast E-DCH access procedure illustrated in FIG. 1 begins with the broadcasting of the configuration of the common E-DCH by the NodeB, which can be used for uplink traffic of UEs in low activity state such as Cell_PCH, URA_PCH and Cell_FACH state. Furthermore, as shown in FIG. 6 a UE in low activity state starts the RACH procedure by sending a request 610 comprising a preamble generated by using a scrambling code and a signature code to access the E-DCH to the NodeB on the PRACH.

Figure 7:
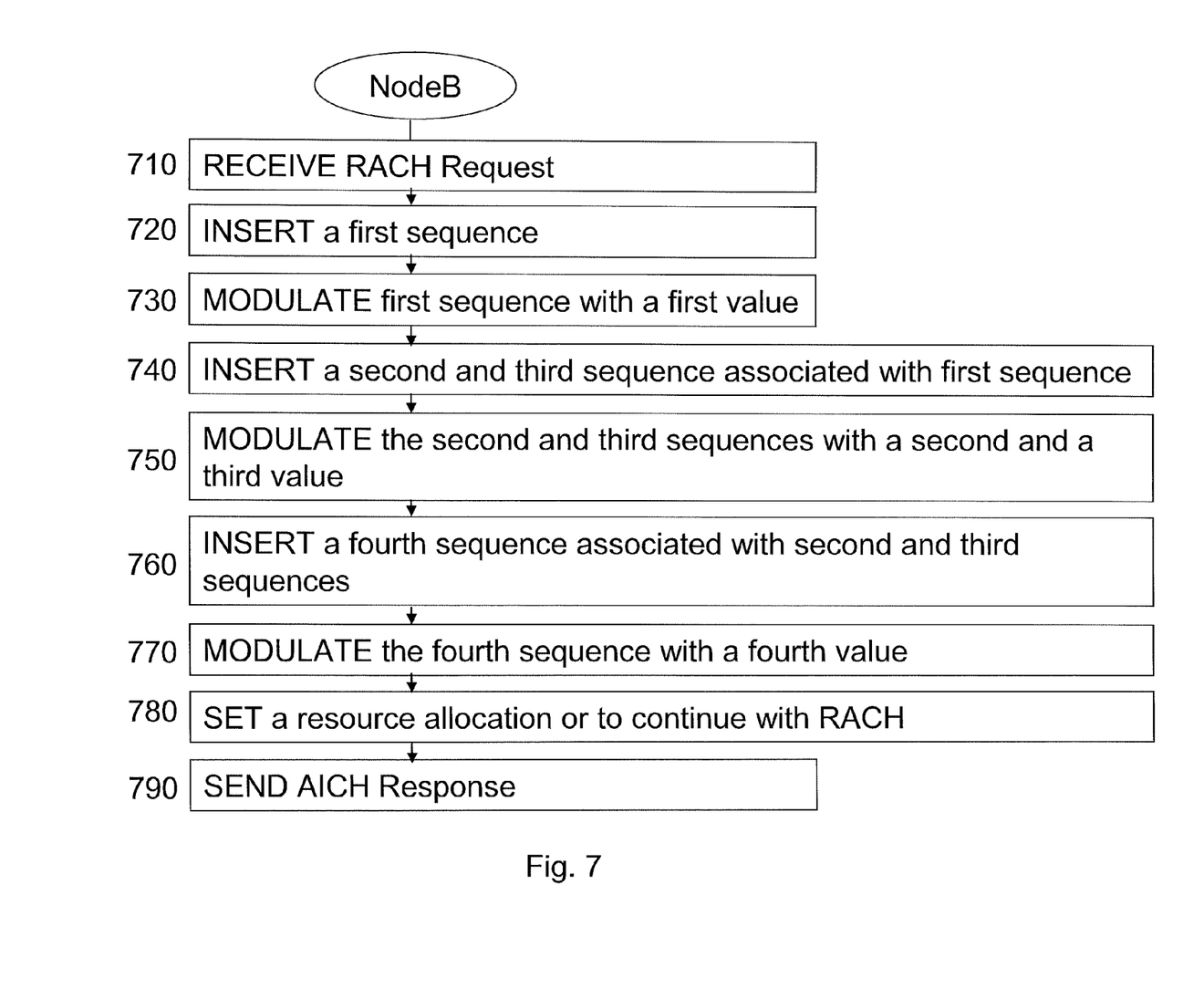
FIG. 7 is a flowchart of the method for a NodeB according to an embodiment of the present invention.

The NodeB receives request 710 on the PRACH as illustrated in FIG. 7. Further, the NodeB sends a response 790 comprising information associated with the detection of the preamble, i.e. an acquisition indicator such as ACK/NACK/DTX, to the UE on the AICH. The response further comprises an indication of an action to be taken by the UE in an extension of the AICH such as the above-described extension.

As further shown in FIG. 7, the indication is created by inserting 720 a sequence of length 32 bits with index N in the AICH. The sequence N corresponds to the preamble. For example, when a sequence with index 8 in FIG. 5 is chosen, this sequence 8 is then modulated 730 with a value indicating the AI, e.g. the value '+1' in case of ACK or the value '−1' NACK. If sequence 8 is modulated with the value '−1', that is the AI is NACK, the indication is set to indicate the action to access the RACH.

Figure 8:
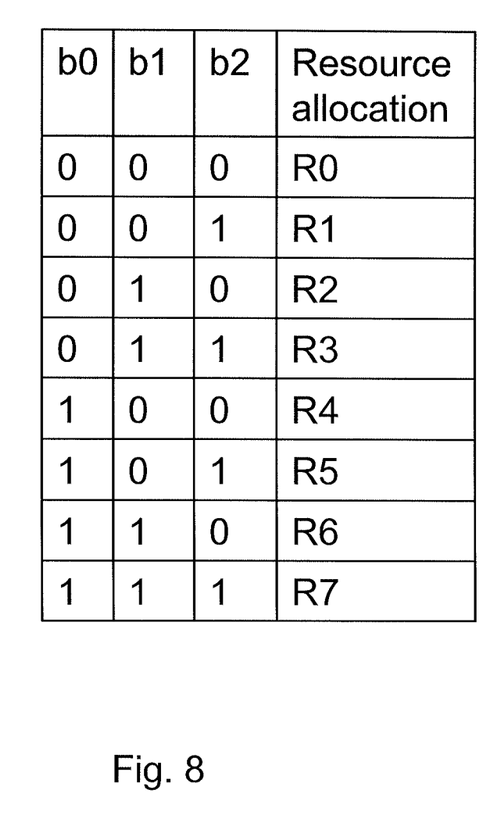
FIG. 8 shows a table of possible resource allocations R0-R7 on the E-DCH.

However, if the AI is ACK and consequently the sequence 8 is modulated with the value '+1', the NodeB allocates a resource on the E-DCH to be used by the UE. The NodeB inserts 740 a second and a third sequence of length 32 bits with index 2×(N−8)+16 and 2×(N−8)+17, respectively, i.e. sequence 16 and sequence 17, in the AICH. The sequences 16 and 17 are then modulated 750 with a value '+1' if a corresponding information bit (b0, b1) has the value '0', or modulated with a value '−1' if the corresponding information bit (b0, b1) has the value '1 '. Furthermore, a fourth sequence of length 8 bits with index N−8, i.e. sequence 0', is inserted 760 in the AICH. The sequence 0' is modulated 770 with a value corresponding to an information bit b2 in the same manner as sequence 16 and 17. The values corresponding to the information bits are set 780 to indicate one of a plurality of preconfigured resource allocations to be used for accessing the E-DCH. Thus, a combination of the information bits b0, b1 and b2 point out one of the plurality of preconfigured resources allocations to be used by the UE for accessing the E-DCH. A table of possible resource allocations R0-R7 is shown in FIG. 8.

Further shown in FIG. 6, the UE receives 620 the response on the AICH from the NodeB. The UE detects 630 from the AICH the sequence with index N, e.g. sequence 8, which corresponds to the sent preamble and derives 640 the modulated value from the sequence N. If the UE derives ACK for the sequence N it further detects 650 the second and the third sequence 2×(N−8)+16 and 2×(N−8)+17. The information bits b0 and b1 are derived 660 by demodulating the corresponding sequences, e.g. sequences 16 and 17, respectively. As a next step, the fourth sequence with index N−8, e.g. sequence 0', is detected 670 and the information bit b2 is derived 680. The UE utilizes the combination of the information bits b0, b1 and b2 to determine 690 one of the 8 preconfigured resource allocations, i.e. one of R0-R7, to be used accessing the E-DCH.

In a further embodiment of the present invention, the acquisition indicator information, i.e. '+1', '0 ' or '−1', is mapped not only to the first 16 sequences of length 32 bits, i.e. sequences 0-15, but also to the last 16 sequences of length 32 bits i.e. sequences 16-31 and/or the 8 sequences of length 8 bits, i.e. sequences 0'-7'. This means that up to three acquisition indicator information bits can be transmitted, which can be used to indicate one out of 27, i.e. $3^3$, preconfigured resource allocations to up to 8 fast E-DCH access users.

In yet another embodiment of the present invention, the acquisition indicator for the fast E-DCH users is not represented directly by a sequence of the sequences 8-15 but by a combination of this sequence and the two corresponding sequences between 16-31 and the corresponding sequence between 0'-7'. This means that the sequences can represent not only 3 but 4 information bits of either two-state or tri-state information, where one bit combination represents NACK and the other bit combinations represent ACK plus a resource allocation.

In yet another embodiment of the present invention, fast E-DCH users can be directed to continue their access with the conventional RACH procedure, e.g. in case of resource shortage in the NodeB. This can be achieved using a subset of the total number of resource allocation indications obtained from the two-state or tri-state mapping of the additional 16 sequences of length 32 bits and/or the 8 additional sequences of length 8 bits. As an example, if DTX used on the corresponding pair of additional sequences of length 32 bits and/or DTX is used on the corresponding sequences of length 8 bits, the UE will continue with the conventional RACH procedure. In yet another example, if DTX is not used on either of the sequences, one combination e.g. (+1,−1) of the sequences is used to indicate to the UE to access RACE.

When many sequences with the same information content are sent to multiple fast E-DCH access users in parallel the peak-to-average power ratio could be a problem. Especially, it is a problem in the first QPSK symbol of each sequence of length 32 bits.

To reduce the peak power, the mapping of ACK/NACK in some of the sequences of length 32 bits with index 8-15 is modified from the mapping described in the above-mentioned embodiments of the present invention. As an example, the mapping of ACK is changed to the value '−1' and the mapping of NACK is changed to the value '+1' instead of the other way around for the sequences 8, 10, 12 and 14 of length 32 bits.

Furthermore, the mapping of the information bits b0 and b1 in some of the sequences of length 32 bits with index 16-31 is modified from the mapping described in the above-mentioned embodiments of the present invention. As an example, the mapping of information bit value '0 ' is changed to '−1' instead of '+1'. The mapping of information bit value '1 ' is changed to '+1' instead of '−1' for the sequence pairs (16,17), (20,21), (24,25), and (28,29) of length 32 bits.

Similarly, the mapping of information bits in some of the sequences of length 8 bits with index 0'-7' is modified from the mapping described in the above-mentioned embodiments of the present invention. As an example, the mapping of information bit value '0 ' is changed to '−1' instead of '+1'. The mapping of information bit value '1 ' is changed to '+1' instead of '−1' for the sequences 0', 2', 4' and 6' of length 8 bits.

In another embodiment of the present invention, as an alternative realization of the modified ACK/NACK mapping, the same result can be achieved by leaving the ACK/NACK mapping unchanged, i.e. ACK means '+1' and NACK means '−1', and instead inserting a multiplication of some of the pairs of the additional sequences of length 32 bits, i.e. sequences 16-32 and some of the additional sequences of length 8 bits, i.e. sequences 0'-7'. The multiplication is known to both UE and the NodeB, e.g. through higher layer signaling or through explicit specification in the standard.

It should be pointed out that instead of the multiplication a pre-modulation could be performed to achieve the same result. As an example, the sequence pairs (16,17), (20,21), (24,25) and (28,29) are pre-modulated with '−1', and/or the sequences 0', 2', 4' and 6' are pre-modulated with '−1'.

Figure 9:
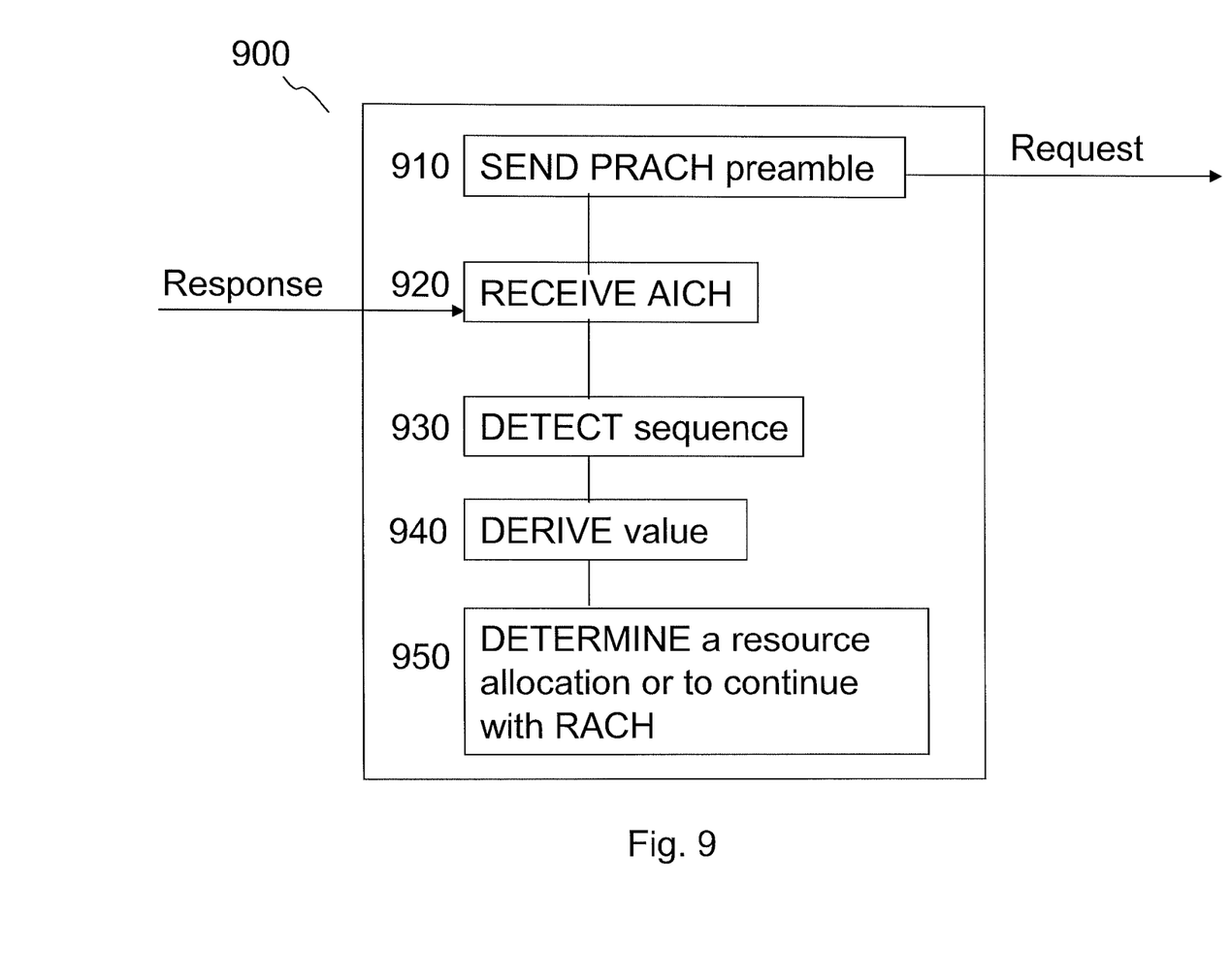
FIG. 9 illustrates the means to be implemented in the UE according to an embodiment of the present invention.

In accordance with further aspects of the invention, the present invention relates to arrangements in a UE and in a NodeB. Turning now to FIG. 9 illustrating the means to be implemented in the UE according to one embodiment.

The UE 900 adapted for accessing an uplink channel when being in a low activity state comprises a sender for sending 910 a random access request comprising a preamble on the PRACH to the NodeB. It also comprises a receiver for receiving 920 a response comprising information associated with detection of the preamble at the NodeB on the AICH from the NodeB. Furthermore, the response comprises in an extension of the AICH an indication of an action to be taken by the UE.

Further, the UE comprises means for detecting 930 a first sequence corresponding to the preamble and a second, third and fourth sequence orthogonal to and associated with the first sequence in the extension of the AICH. Moreover, the UE comprises means for deriving 940 a first modulated value from the first sequence and a second, third and fourth modulated value by demodulating the second, third and fourth sequences, respectively. Additionally, the UE comprises means for determining 950, based on the first, second, third and fourth modulated values, one of a plurality of preconfigured resource allocations to be used for accessing the E-DCH or to accessing the RACH.

Figure 10:
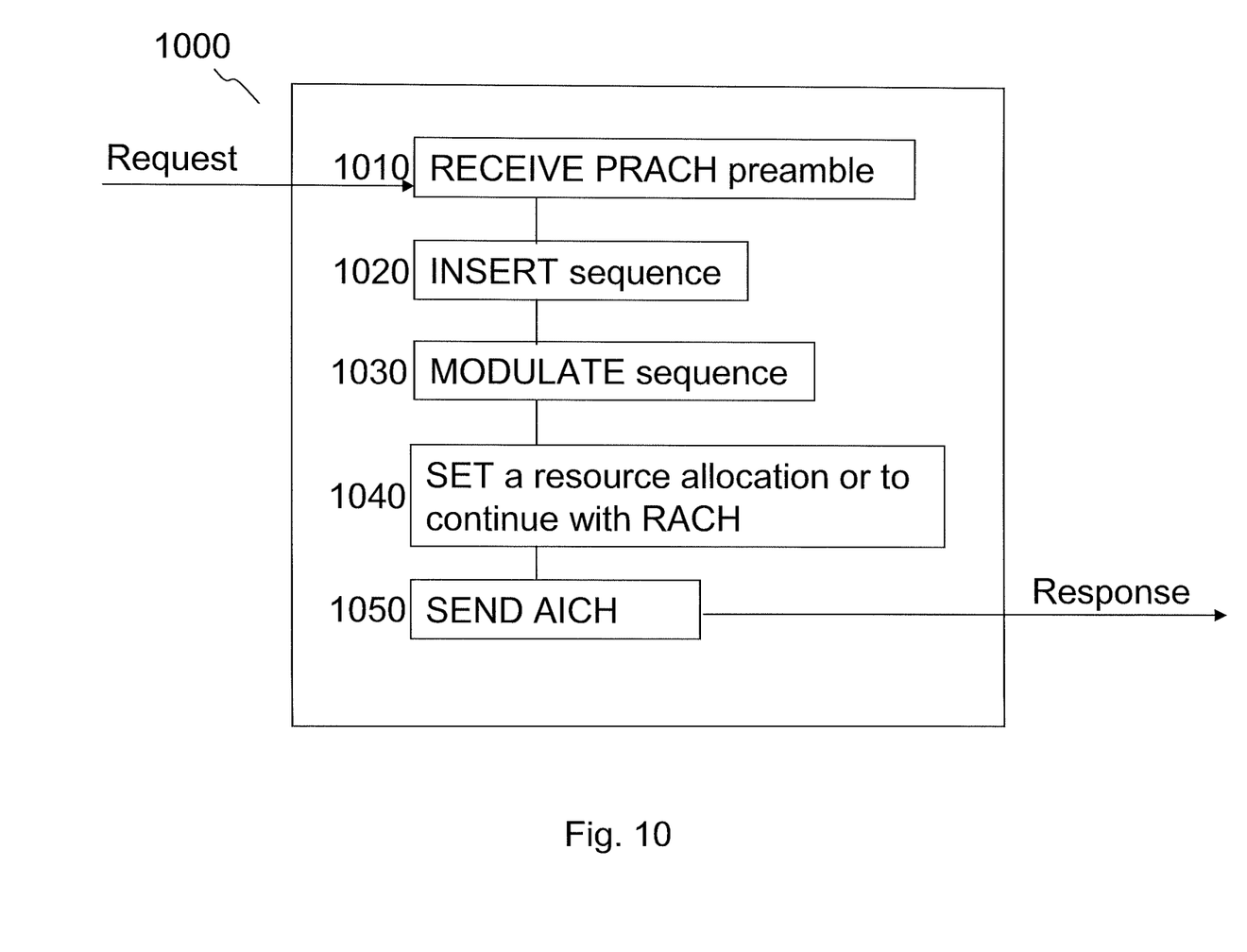
FIG. 10 illustrates the means to be implemented in the NodeB according to embodiments of the present invention.

Turning now to FIG. 10 illustrating the means to be implemented in the NodeB according to one embodiment.

The NodeB 1000 adapted for signaling uplink channel access information comprises a receiver for receiving 1010 the random access request comprising the preamble on the PRACH. It also comprises a sender 1050 for sending in response to the received random access request the response comprising the information associated with detection of the preamble on the AICH to the UE. As mentioned, the response comprises in an extension of the AICH an indication of an action to be taken by the UE.

Further, the NodeB comprises means for inserting 1020 in the AICH a first sequence corresponding to the preamble and a second, third and fourth sequence orthogonal to and associated with the first sequence in the extension of the AICH. Moreover, the NodeB comprises means for modulating 1030 the first sequence with a first modulated value and the second, third and fourth sequences with a second, third and fourth value, respectively. Additionally, the NodeB comprises means for setting 1040 the first, second, third and fourth value to indicate one of a plurality of preconfigured resource allocations to be used for accessing the E-DCH or to accessing the RACH.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for a radio base station for signaling uplink channel access information to a user equipment (UE) being in a low activity state, the method comprising:
   receiving a random access request on a physical random access channel (PRACH), the random access request comprising a preamble; and
   sending a response to the received random access request on an acquisition indicator channel (AICH), the response comprising information associated with detection of the preamble and, in an extension of the AICH, an indication of an action to be taken by the UE;
   wherein the indication is created by:
   inserting, in the AICH, a first sequence corresponding to the preamble;
   modulating the first sequence with a first value;
   inserting, in the extension of the AICH, a second sequence and a third sequence orthogonal to and associated with the first sequence;

modulating the second sequence and the third sequence with a second value and third value, respectively;

inserting, in the extension of the AICH, a fourth sequence associated with the second sequence and the third sequence;

modulating the fourth sequence with a fourth value; and setting the first value, the second value, the third value, and the fourth value to indicate one of a plurality of preconfigured resource allocations to be used for accessing an enhanced dedicated channel (E-DCH) or for accessing a random access channel (RACH).

2. The method of claim 1, wherein the action is to access the E-DCH, and wherein the response comprises configuration parameters for the E-DCH.

3. The method of claim 1, wherein the action is to access the RACH.

4. The method of claim 1, wherein the second sequence and the third sequence are picked from a set of sequences which corresponds to a 90 degree phase shifted version of the set of sequences used for the first sequence.

5. The method of claim 1, wherein the first, second, and third orthogonal sequences are 32-bit sequences.

6. The method of claim 5, wherein the fourth orthogonal sequence is an 8-bit extension of the second and third orthogonal sequences.

7. The method of claim 1, wherein the first value is associated with a mapping of an acquisition indicator.

8. The method of claim 1, wherein a combination of the first, second, third, and fourth values is associated with a mapping of an acquisition indicator.

9. The method of claim 8, wherein the AICH comprises a plurality of sequences and the mapping of the first, second, third, and fourth values is modified in a selected number of the plurality of sequences to reduce a peak-to-average power ratio.

10. A method for a user equipment (UE) being in a low activity state, for accessing an uplink channel, the method comprising:

sending a random access request on a physical random access channel (PRACH) to a radio base station, the random access request comprising a preamble;

receiving a response on an acquisition indicator channel (AICH), the response comprising information associated with detection of the preamble at the radio base station; and determining from the response, in an extension of the AICH, an indication of an action to be taken by the UE;

wherein the indication is interpreted by:

detecting from the AICH a first sequence corresponding to the preamble;

deriving a first modulated value from the first sequence;

detecting in the extension of the AICH a second sequence and a third sequence orthogonal to and associated with the first sequence;

detecting in the extension of the AICH a fourth sequence associated with the second sequence and the third sequence;

deriving a second modulated value, a third modulated value, and a fourth modulated value by demodulating the second sequence, the third sequence, and the fourth sequence, respectively; and determining, based on the first modulated value, the second modulated value, third modulated value and fourth modulated values, one of a plurality of preconfigured resource allocations to be used for accessing an enhanced dedicated channel (E-DCH) or to access a random access channel (RACH).

11. The method of claim 10, wherein the action is to access the E-DCH and the response comprises configuration parameters for the E-DCH.

12. The method of claim 10, wherein the action is to access the RACH.

13. The method of claim 10, wherein the second sequence and the third sequence are picked from a set of sequences which corresponds to a 90 degree phase shifted version of the set of sequences used for the first sequence.

14. A radio base station adapted for signaling uplink channel access information to a UE being in a low activity state, wherein the radio base station comprises:

a receiver for receiving a random access request on a physical random access channel (PRACH), the random access request comprising a preamble; and a transmitter for sending a response to the received random access request on an acquisition indicator channel (AICH), the response comprising information associated with detection of the preamble and, in an extension of the AICH, an indication of an action to be taken by the UE;

wherein the radio base station is adapted to create the indication by being configured to:

insert in the AICH a first sequence corresponding to the preamble;

modulate the first sequence with a first value;

insert in the extension of the AICH a second sequence and a third sequence orthogonal to and associated with the first sequence;

insert in the extension of the AICH a fourth sequence associated with the second sequence and the third sequence;

modulate the second sequence, the third sequence, and the fourth sequence with a second value, a third value, and a fourth value, respectively; and set the first value, the second value, the third value, and the fourth value to indicate one of a plurality of preconfigured resource allocations to be used for accessing an enhanced dedicated channel (E-DCH) or to access a random access channel (RACH).

15. The radio base station of claim 14, wherein the action is to access the E-DCH and the response comprises configuration parameters for the E-DCH.

16. The radio base station of claim 14, wherein the action is to access the RACH.

17. The radio base station of claim 14, wherein the second and the third sequences orthogonal to the first sequence are picked from a set of sequences which corresponds to a 90 degree phase shifted version of the set of sequences used for the first sequence.

18. The radio base station of claim 14, wherein the first, second, and third orthogonal sequences are 32-bit sequences.

19. The radio base station of claim 18, wherein the fourth orthogonal sequence is an 8-bit extension of the second and third orthogonal sequences.

20. The radio base station of claim 14, wherein the first value is associated with a mapping of an acquisition indicator.

21. The radio base station of claim 14, wherein a combination of the first, second, third, and fourth values is associated with a mapping of an acquisition indicator.

22. The radio base station of claim 21, wherein the AICH comprises a plurality of sequences and the mapping of the first, second, third, and fourth values is modified in a selected number of the plurality of sequences to reduce a peak-to-average power ratio.

23. A user equipment (UE) adapted for accessing an uplink channel when being in a low activity state, wherein the UE comprises:
- a transmitter for sending a random access request on a random access channel (PRACH) to a radio base station, the random access request comprising a preamble; and
- a receiver for receiving a response to the random access request on an acquisition indicator channel (AICH), the response comprising information associated with detection of the preamble at the radio base station;
- wherein, the UE is configured to determine from the response, in an extension of the AICH, an indication of an action to be taken by the UE; and
- wherein the UE is configured to determine the indication by being configured to:
  - detect from the AICH a first sequence corresponding to the preamble;
  - derive a first modulated value from the first sequence;
  - detect in the extension of the AICH a second sequence and a third sequence orthogonal to and associated with the first sequence;
  - detect in the extension of the AICH a fourth sequence associated with the second sequence and the third sequence;
  - derive a second modulated value, a third modulated value, and a fourth modulated value by demodulating the second sequence, the third sequence, and fourth sequence, respectively; and
  - determine, based on the first modulated value, the second modulated value, the third modulated value, and fourth modulated value, one of a plurality of preconfigured resource allocations to be used for accessing an enhanced dedicated channel (E-DCH) or to access a random access channel (RACH).

24. The UE of claim 23, wherein the action is to access the E-DCH and the response comprises configuration parameters for the E-DCH.

25. The UE of claim 23, wherein the action is to access the RACH.

* * * * *

UNITED STATES PATENT AND TRADEMARK OFFICE
CERTIFICATE OF CORRECTION

PATENT NO.         : 8,437,295 B2
APPLICATION NO.    : 12/740080
DATED              : May 7, 2013
INVENTOR(S)        : Gerstenberger et al.

Page 1 of 1

It is certified that error appears in the above-identified patent and that said Letters Patent is hereby corrected as shown below:

On the Title Page, in item (75), under "Inventors", in Column 1, Line 3, delete "Taby" and insert -- Täby --, therefor.

On the Title Page, in item (75), under "Inventors", in Column 1, Line 3, delete "Jose Luis" and insert -- José Luis --, therefor.

In the Specifications

In Column 4, Line 65, delete "length bits," and insert -- length 8 bits, --, therefor.

In Column 7, Line 19, delete "RACE." and insert -- RACH. --, therefor.

Signed and Sealed this
Twenty-eighth Day of January, 2014

Michelle K. Lee
*Deputy Director of the United States Patent and Trademark Office*